Figures 1, 2:
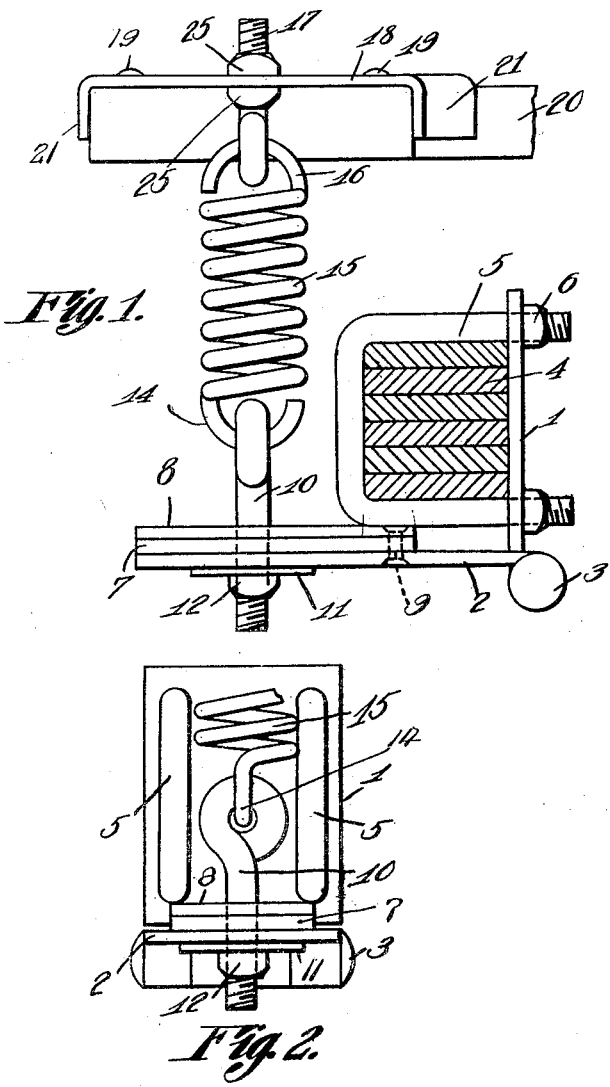

Dec. 30, 1924.

J. O. LINDSEY

SHOCK ABSORBER SNUBBER

Filed April 7, 1922

1,521,452

J.O. Lindsey, Inventor

C.A. Snow & Co.
Attorneys

Patented Dec. 30, 1924.

1,521,452

UNITED STATES PATENT OFFICE.

JAMES OWEN LINDSEY, OF COMANCHE, TEXAS.

SHOCK-ABSORBER SNUBBER.

Application filed April 7, 1922. Serial No. 550,389.

*To all whom it may concern:*

Be it known that I, JAMES OWEN LINDSEY, a citizen of the United States, residing at Comanche, in the county of Comanche and State of Texas, have invented a new and useful Shock-Absorber Snubber, of which the following is a specification.

This invention aims to provide a simple shock absorber and snubber which may be attached to a vehicle of any kind without working changes therein, the device exercising its function without interfering with the operation of the springs of the vehicle, and be so constructed that the constituent parts will remain assembled under the severe use to which devices of the sort alluded to are subjected commonly.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is a side elevation, wherein parts are broken away.

The device forming the subject matter of this application includes a rigid main plate 1 and a rigid main plate 2, the plates 1 and 2 being connected by a hinge 3. Any suitable means may be provided for connecting the plate 1 to the springs 4 of a vehicle. If desired, the plate 1 may extend upwardly along the spring 4 and U-bolts 5 may surround the spring, ends of the U-bolts passing through the plate 1 and carrying nuts 6 which engage the plate 1. The auxiliary plate 2 extends beneath the spring 4. A reinforcing strip 7, generally made of metal, is mounted on the plate 2 and a cushion strip, 8 made of leather or any other suitable material is superposed on the strip 7, the strips 7 and 8 being secured at 9 to the plate 2. A connecting element 10, such as an eye-bolt, passes downwardly through the members 8 and 7, and through the plate 2. A nut 12 is threaded on the connecting element 10, a washer 11 being interposed between the nut and the plate 2. The eye of the connecting element 10 is engaged with a hook 14 at the lower end of a retractile spring 15, provided at its upper end with a hook 16 adapted to cooperate with an eye bolt 17 extended upwardly through a retaining member 18, in the form of a plate, adapted to be secured at 19 to any accessible portion of the frame 20 of a vehicle, the retaining member 18 having depending flanges 21 which engage the portion 20 of the frame of the vehicle.

In practical operation, the body of the vehicle, represented by the part 20 may move downwardly in the ordinary way, when the spring 4 is compressed. When the body 20 of the vehicle moves upwardly to an unusual extent upon a rebound, the cushion strip 8, the reinforcing strip 7 and the auxiliary plate 2 will cooperate with the U-bolts 5 and limit the upward swinging movement of the plate 2, the spring 15 being put under tension, and the upward movement of the vehicle body being checked. The tension of the spring 15 may be adjusted through the instrumentality of the connecting element 10 and the nut 12, the eye bolt 17 being held in the retaining plate 18 by nuts 25, and it being possible if considered desirable or expedient, to adjust the tension of the spring 15, through the instrumentality of the nuts 25.

Having thus described the invention, what is claimed is:

1. A device of the class described comprising hingedly connected members disposed at an angle to each other, means for connecting one of said members to one edge of a vehicle spring in a substantially vertical position and to dispose the other of said members below the spring transversely of the spring, a retractile resilient element, means for connecting the resilient element to said other member, and means for connecting the resilient element to a vehicle frame.

2. A device of the class described, constructed as set forth in claim 1, and further characterized by a cushion mounted on the upper surface of said other member.

In testimony that I claim the foregoing as my own, I have hereto affixed my signature in the presence of two witnesses.

JAMES OWEN LINDSEY.

Witnesses:
B. McPHERSON,
W. T. McPHERSON.